June 27, 1950 L. W. BEAVEN 2,512,909
ROTARY VALVE ENGINE
Filed Aug. 7, 1946 3 Sheets-Sheet 1

INVENTOR
LESLIE W. BEAVEN
By
ATT'Y

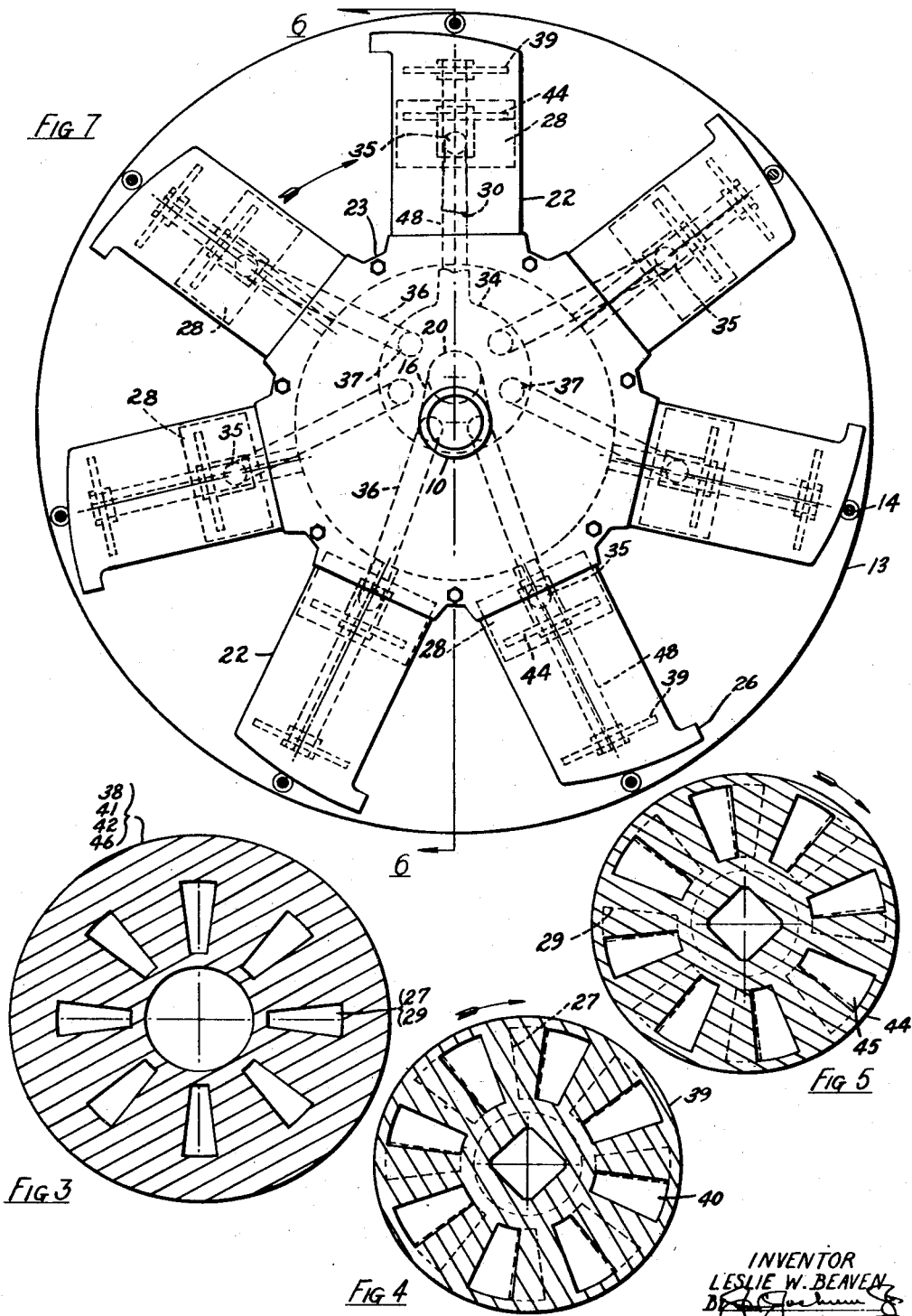

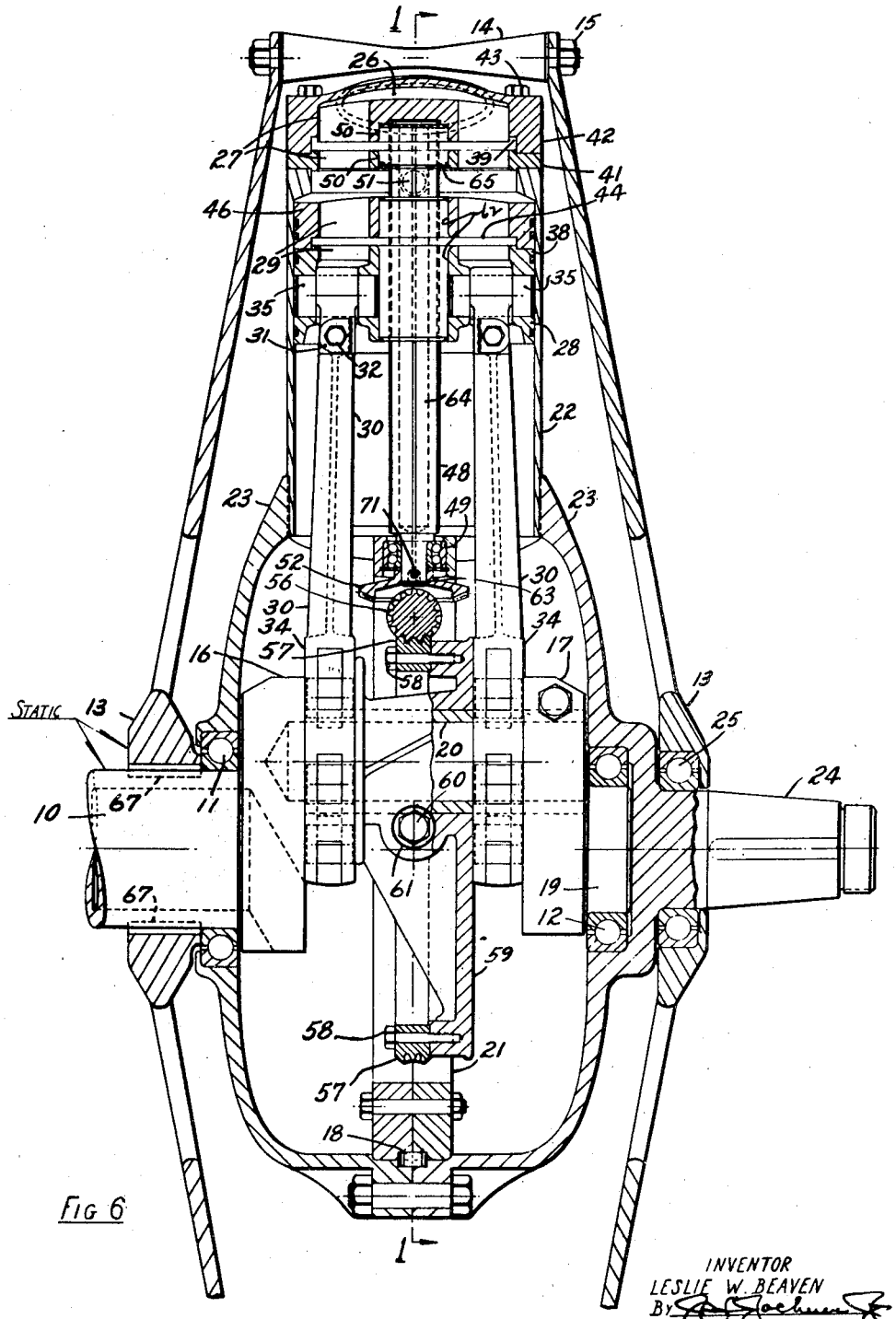

Patented June 27, 1950

2,512,909

UNITED STATES PATENT OFFICE 2,512,909

ROTARY VALVE ENGINE

Leslie W. Beaven, Chicago, Ill.

Application August 7, 1946, Serial No. 688,984

14 Claims. (Cl. 123—44)

This invention relates in general to improvements in internal combustion engines, but more specifically to valving mechanism, in which there is provided one or more radially disposed cylinders having pistons therein that are connected to a crankshaft, a relative lineal movement between the cylinders and pistons being effected by imparting rotary movement between the cylinders and the crankshaft, and is here presented in the preferred form known as the rotary radial, or spinner type engine.

The rotary radial, an engine of many qualities, became practically obsolete about 30 years ago, due partly to difficulties with centrifugal forces acting upon the valves and valve gear, and in part to the general fault inherent in poppet valves, that the path of the gas flow is necessarily crooked in getting the gases around the head and stem of the valve, which has a throttling effect. Low piston and cylinder life, due to the presence of gasoline as fuel in the crank case, discouraged effort to solve the valve problems.

At present there is a tendency, in aviation, to reduce fire hazard and fuel costs by abandonment of gasoline in favor of fuel oil, the gas turbine being the best current means, the Diesel being too heavy and too complicated, and the explosive type not yet available for fuel oil. The gas turbine is simple, light and vibrationally quiet. But it has very low fuel efficiency, because it operates on low pressure combustion. The gases are not confined as in a piston engine, wherein high pressure combustion is both possible and efficient.

Often in the past, progress has been made by picking up an old abandoned trail. In this case the rotary or spinner type of piston engine, burning fuel oil, with valves suitable for speeds in the turbine range, is practicable, and gives cheaper, safer and quieter transportation. The tappet valve with its intermittent operation is annoyingly noisy.

It is one of the objects of the present invention to overcome these difficulties and objections, and to provide a rotary radial, or spinner engine, wherein rotary valves are slip-fitted upon a valve shaft in axial alinement with its cylinder, and which rotates the valves between two faces having suitable clearance, thereby adapting each valve to be seated on either of its two faces, as the external forces acting upon it as the cycle progresses, shall dictate. These valves may or may not be as tight as poppet valves, but such tightness is not essential. The importance of tightness is in an inverse ratio to speed, and high speed is one of the objects of the present invention, these rotary valves revolving slowly but continuously, while under pressure of explosion, compression, suction or inertia.

Another object is to provide a valve construction of this character, having a greater cross-section area of the ports than is practicable with poppet valves; to provide a straight path for the gases, which will not only improve the efficiency of the engine, but will also reduce the weight per H. P. as compared with current piston engines, and to render it possible to place the path of flow of the gases where there is room for ports of larger diameters.

A further object is to place the path of flow of the gas where flow will be assisted, in an engine of this type, by centrifugal force, both for charging and for scavenging the engine.

A further object is to provide a construction and arrangement of the parts that will render it possible to use either the two-stroke cycle or a four-stroke cycle. In the accompanying drawings, there is shown the four-stroke cycle, in which the valve functions are related to two revolutions of the engine, and there is shown spark igniting means, although any other means may be employed for igniting the compressed charge. In a two-cycle engine, valve functions are related to one revolution of the engine, which requires only a different ratio of the gearing. In the present invention, in the two-stroke cycle, the radial flow of the gases and the large valving area insures more complete scavenging, and prevents the dilution of the admitted charged by the exhaust gases, and the loss of unburned mixture through the exhaust port.

Another object is to provide an engine of this character, wherein the valves are so positioned that they may be lubricated without difficulty; where they will be somewhat cooled by the liquid fuel, and where the heat which they acquire will assist in vaporizing the fuel.

A further object is to provide an improved rotary or spinner engine of this character, wherein the usual poppet valves are omitted. Poppet valves are objectionably noisy in operation. Also, because of the resistance to flow in getting the gases around the valve head and stem, it is necessary to double their number on fast motors, such as are used on racing cars. On a rotary motor with poppet valves, the inertia stress of centrifugal force can be offset by fly weights, as was done in my co-pending application, Serial Number 623,540, on Rotary Reaction Engines, now abandoned, but the use of such weights increases the mass and reluctance, which introduces high stresses at high speed. In the present invention, the valves are placed in a position where there is adequate space for a large diameter, and the design of the valve causes many ports to be opened simultaneously.

It is therefore another object of this invention to enable an engine equipped with the present valve mechanism, to be run at near turbine speeds, thereby delivering greater power per pound of engine, and to reduce the noise of operation, as well as to straighten, and to shorten, the path of flow of the gases through the ports, thereby reducing power losses of gas flow, of undercharging, and of back pressure in scavenging the cylinders.

Another object is to dispense with an intermittent valve action, which action causes a power loss by inertia. The present valve mechanism is adaptable to either the four-stroke or two-stroke cycle, as the only mechanical change necessary is a different speed ratio of valve revolutions to the engine or cylinder rotations, the two-cycle valve mechanism operating twice as fast as the four-cycle. The relative positions of the port openings may be altered to suit the characteristics of the engine, as explained later.

Another object is to make use of the reaction from the force exerted by the escaping exhaust gases to increase the torque and power of the engine.

Still another object is to simplify the method of lubrication of the valve and valve gear, by placing them within the motor so that lubrication can flow radially outward under the influence of the flow of gases and of centrifugal force, and to utilize the heat absorbed by the valves, to assist in vaporizing the fuel and, conversely, to assist in cooling of the valves by wetting them with the liquid fuel.

A still further object is to provide a spinner engine of this character, which will be of a simple construction, and in which a radial path of flow of the gases is provided, so that centrifugal force will assist in the charging and scavenging of the cylinders, giving a valuable measure of supercharging effect without added mechanical parts.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings exemplifying this invention, in which Fig. 1 is a longitudinal sectional view, taken through one cylinder, of an engine of this character, constructed in accordance with the principles of this invention, and as taken on line 1—1, Fig. 6.

Fig. 3 is a detail sectional view taken on lines 3—3, Fig. 1, showing the valve ports for both intake and exhaust, with parts omitted, the said ports being superposed in the drawings, for reasons of simplicity.

Fig. 4 is a detail sectional view of the exhaust valve, taken on line 4—4, Fig. 1, with parts omitted.

Fig. 5 is a detail sectional view of the intake valve, taken on line 5—5, Fig. 1, with parts omitted.

Fig. 6 is a longitudinal sectional view through the engine, on a plane containing the cylinder axis and the axis of rotation of the engine, on line 6—6, Fig. 7.

Fig. 7 is a diagrammatical view taken from the rear of the engine, with parts omitted.

Figures 1, 2:
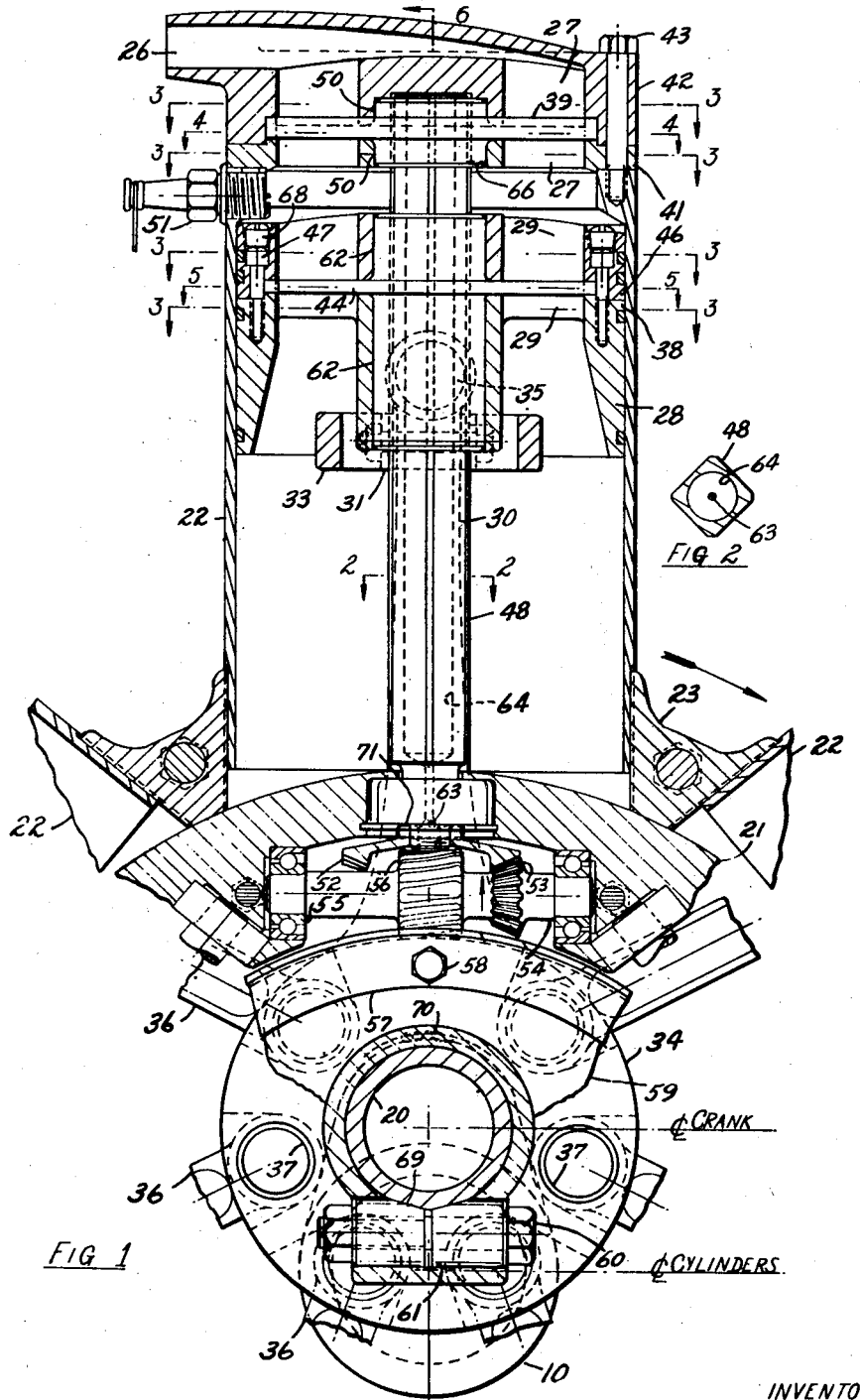
Fig. 2 is a detail sectional view taken on line 2—2, Fig. 1.

Referring more particularly to the drawings, the numeral 10 designates a hollow crankshaft which is stationary, and is supported in the wall of a crank casing 13, the shaft and outer casing being stationary, and being held in fixed angular relation by main keys 67. The casing may consist of spaced walls or members which are secured together by any suitable means, such as spacers 14, and fastening bolts and nuts 15, or the like. The hollow crankshaft 10 is the fuel and air intake pipe of the engine and communicates with the interior of the rotating crankcase 23 as shown by dotted lines in Figure 1 and Figure 6.

The shaft 10 is provided with a crank, preferably formed by spaced cheeks 16, 17, connected together by a shaft or crank-pin 20, and secured to the cheek 17 is a stub shaft 19. The shaft 10 and the stub shaft 19 are respectively journaled in bearings 11 and 12 that are mounted in the walls of the rotating crank casing 23. One of the walls 23 of the crank casing is provided with a stub shaft 24, which is journaled in a ball bearing 25, and extends to the outside of the crank casing, to form the output shaft.

A plurality of open-ended radially disposed cylinders 22 are supported by, and have communication with the interior of the crank case, and any number of these cylinders may be provided; also a plurality of rows, according to the characteristics desired in the motor. These cylinders rotate with the crank case, which action is permitted by reason of the bearings 11, 12 and 25. Each cylinder is provided, in its end, with an exhaust outlet 26 discharging in a direction opposed to the direction of rotation of the cylinders about the shaft 10, thereby making full use of the forces of reaction arising from the discharge of the exhaust gases, as taught in my co-pending application Serial Number 623,540, aforesaid, on Rotary Reaction Engines.

Arranged in the head of each of the cylinders are passages or exhaust ports 27, which preferably are bounded by radial lines and concentric arcs (shown in Fig. 4), and reciprocable in the cylinder is a piston 28, which is also provided with similarly shaped intake ports or passages 29. A pair of master connecting rods 30 are rotatably journaled to the crank pin 20 on bearing 70, and the rods are connected to one of the pistons 28. These master connecting rods or pitmans may be of any desired or suitable construction, each of which is provided with an enlarged or disc-shaped portion 34, being spaced from each other in directions lengthwise of the shaft. Each of the connecting rods is pivotally connected to the piston in any suitable manner, such as by means of wrist pins 35. Link rods 36 are pivotally connected, at one end, to the enlarged or disc-shaped portion of the master rods 34, by knuckle pins 37, while the other end of each link rod is pivotally connected to its respective piston 28, by wrist pins 35, so that when the cylinders are rotated about the crankshaft, a relative reciprocatory movement will be imparted between the cylinders and their respective pistons.

Any suitable means may be provided for connecting the pairs of connecting rods 30 and 36 together, so as to prevent the pistons 28 from twisting in the cylinders 22, from frictional drag of the rotating valves 44. A suitable and efficient means embodies two yoke-like members 31, secured by their ends to the connecting rods by means of bolts 32 or the like, and each yoke may be provided with a semi-circular portion 33 (Fig. 1), which, when the yokes are assembled and secured to the connecting rods 30 and 36, will provide a space for the valve operating shaft, hereinafter described. These yoke plates 31 are small enough to operate in the cylinders, and large enough to clear the valve shaft at all times.

Seated within the cylinder head is a rotary exhaust valve 39, shown as disc-shaped. It will be seen also that it is cylindrical, and might be made conical or otherwise, the valve having port openings 40 (see Fig. 4), corresponding in number, shape and radial location to the openings 27 in the cylinder end. Moreover, these ports are uniformly spaced to register in each angular position. This exhaust valve is preferably held in position by means of a clamping member 41 (the exhaust port plate, inner) and the removable end section 42 of the cylinder (the exhaust port plate, outer), through the medium of fastening bolts 43. The valve is so mounted that it is free to rotate upon its axis, which is in alinement with the axis of the cylinder, and to slide upon the valve shaft 48. The two faces of the valve are ground to fit snugly to either of the adjacent faces of the clamping members 41 and 42, but has a slight clearance so that it cannot become bound, and will seat upon either face, urged by either pressure, vacuum or centrifugal force.

A similar rotary intake valve 44 is similarly seated in the end of the piston 28, and is likewise provided with port openings 45 therethrough (see Fig. 5), corresponding in number, location and shape with the openings 29 in the piston. The valve 44 is preferably held in position by slidably clamping between a removable section 46 of the piston (the intake port plate, outer) and the intake port plate, inner, 38, through the medium of fastening bolts 47. Like the exhaust valve 39, it is free to slide axially on the valve shaft 48, and has a slight clearance between the ground faces on either side. The piston head bolts 47 are protected from oxidation by plugs 68.

The valve shaft 48 is rotatably mounted, at one end, in a double thrust ball bearing 49 supported by an annular ring 21, which is clamped between the two members 23 of the crank case and keyed to same by key 18, and at the other end, as at 50, in a bearing in the head of the cylinder, and in the piston, as at 62. Slidably secured near the end of the shaft, in any suitable manner so as to rotate with the shaft, is the exhaust valve 39. The shaft is disposed parallel to the axis of the cylinder, and extends lengthwise thereof, and is angular in cross-section, preferably splined, or square as shown more clearly in Fig. 2, and is hollow for lightness, and acts as a means for conveying lubricant. This shaft is slip-fitted through the intake valve 44, so that as the piston is reciprocated, the valve 44 will slide lengthwise of the shaft, and as the shaft opening in the valve is angular in cross-section, so as to fit the shaft, the valve 44 will rotate with the shaft, while not interfering with the reciprocating movement of the valve with respect to the shaft. The explosion space for the charge is disposed between the valves 44 and 39, and an ignition device, such as a spark plug 51, is provided to ignite the charge. Ignition may also be achieved by high compression, if desired, as is done in the semi-Diesel type engines, or by any other means.

As the piston 28 is reciprocated, the valves 44 and 39 are rotated by the rotation of the shaft 48, in timed relation, so as to open and close, respectively, the ports or passages 29 and 27, and in the proper manner, according to whatever cycle the engine is operating upon, to admit the charge to the explosion space, compress it, and after ignition and expansion of the charge, to scavenge the cylinder of burnt gases.

Any suitable means may be provided for rotating the shaft 48. A simple and efficient means embodies a bevel gear 52 secured to the inner end of the valve shaft by pin 71, or by other suitable means, and which gear meshes with a bevel pinion gear 53 on a counter-shaft 54, journaled in suitable bearings 55, preferably of the ball bearing type.

Secured to the shaft 54, to rotate therewith, is a spiral pinion gear 56 that meshes with a spiral ring gear 57. This spiral gear 57 may be supported in any suitable manner, but is preferably of an annular configuration, and is secured by means of cap screws 58, or other suitable fastening devices, to a spider member 59 that is secured to the crank pin 20, preferably by being clamped thereon by means of a bolt 60, passing through wedge blocks 61 slidably mounted within the spider 59, locking the spider into position by engagement of the flat-lands 69 on the crank pin. The ring gear 57 is disposed between the twin rows of connecting rods 30 and 36, its pitch circle being coaxial with the engine main bearings.

It is to be understood that while the valve mounting and operating means has been described in connection with only one cylinder and piston, similar mechanism is employed for each of the pistons and cylinders, there being the difference that the complete cylinder shown carries the master rod pair, while the others carry the link rod pairs. It will therefore be seen that as the center of rotation of the pistons, to which the piston rods are attached (viz., the crank pin), is eccentric to the center of rotation of the cylinders (the main bearings), there will be imparted a relative movement between the pistons and cylinders, and as the cylinders rotate, the stationary spiral ring gear 57 will cause a rotation of the spiral pinion gear 56, which in turn will rotate the bevel gears 53 and 52, to rotate the valve shaft 48, which will cause a rotation of the valves 44 and 39. These valves operate in timed relation with respect to the admission of the charge, compression thereof, ignition and explosion, and finally the scavenging of the burnt gases.

In Figs. 1 and 6, the piston is shown at top dead center. This position occurs twice in the cycle of operation of a four-stroke cycle: once between compression and expansion, and again between the exhaust and intake strokes. The ports and valve passages shown in Figs. 3, 4 and 5 indicate the later position, as the port outlines of Fig. 3, shown dotted over Figs. 4 and 5, indicate that the intake valve has started to open, and the exhaust valve has not quite closed.

The cycle depicted is the four-stroke cycle, with valve timing as follows:

Intake opens 40° early, closes 62° late, duration 282°.

Exhaust opens 76° early, closes 26° late, dura-282°. The geared ratio of the valve shaft is one revolution of engine, divided by twice the number of valve ports for four-cycle, giving one over sixteen. The valve angles are therefore one-sixteenth of the engine angles of 40° and 26° away from the said position; namely, intake opens 40° early, closes 62° late, or 2½° and 1⅝° early and late. This fixes the relationship of the radial position of the engine ports to those of the two valves, and of the functions of each valve to the other, the relation being constant with all four-cycle engines, although a different constant is used in different engines, according to their service requirements. This is also true of two-cycle engines.

It is thought that from the above, the operation of this improved engine and valve mechanism will be clearly understood, but, briefly stated, it is as follows:

The four-cycle functions are well known; i. e., intake, compression, expansion and exhaust strokes, but the functions are not confined to exactly 180°, because lag and lead of valve functions are helpful. The rotary valves here disclosed are slip-fitted on the driving shaft, and are slip-clamped between parts of the piston in the case of the intake valve, and parts of the cylinder head in the case of the exhaust valve. In the present exemplification of the invention, the rotating valves are constantly driven at 1/16 engine speed, and the clamping members take care of the thrust upon them, from suction, explosion and centrifugal forces. The members of the valve ports, and the valves themselves, are subjected to a great amount of heat, wear and stress, especially the exhaust members, and therefore may be constructed of any suitable materials that will withstand the conditions to which they are subjected, thereby permitting higher speed to the engine, and therefore, although metal is the current material, it is expected that any refractories later found to have better qualifications, may be employed. In the present exemplification of the invention, eight ports are shown in the valve members. In a two-cycle engine, the ports would all come into registry on each revolution of the engine, by turning ⅛ revolution of the valve shaft. In a four-stroke cycle engine, the ports would come into registry every other revolution of the engine, so the valve shaft will turn 1/16 of engine speed. The numerator represents the turns of the engine, and the denominator, twice the number of ports. The whole fraction represents the ratio of valve shaft speed to engine speed. A low ratio is desirable to reduce friction. The 1:16 ratio may readily be changed to 1:50, if desired, by increasing the number of ports to 25 and the shaft speed ratios to 1 in 50. This type of registration is therefore fractionally circular, or sectoral, as distinguished from circular, the valve turning through a commensurate sector of a circle for each valve cycle, rather than through a full circle, and is the means by which a low ratio of valve turns to engine turns is obtained. This reduces wear and damage to the valves and valve seats.

The number of ports is immaterial to valve capacity, since the circular arcs of the port openings diminish with their number. Capacity is related to radial width of the ports, and this is limited only by piston diameter. This dictates an engine design of short stroke and large bore, which is helpful to high speed, by reducing the radius of gyration and centrifugal stresses. Also, high speed reduces the duration time of the functions of the engine, so that the importance of valve leakage is lessened, and therefore slight leakage of a valve of this character would be unimportant.

The valve shaft is hollow, and serves to carry lubrication on the outside and inside as well, and directing channels are employed, whereby the exhaust valve is lubricated. Entrance is had at 63, thence via duct 64 to channels 65 and 66. Other channels may be provided as needed. The intake valve is preferably lubricated by splash on the outside of the valve shaft. The fuel will serve as the lubricant, if it has lubricating properties. If it has no lubricating properties, lubricant will be mixed with it in suitable proportions. The fuel will also serve as a coolant means, and the heat of the valves will serve as a means for vaporizing the fuel.

The term "disc valve" employed in the specification and claims is intended to cover any type of valve, preferably of disc-like formation, whether flat, conical, concavo-convex, or of any other formation suitable for the purpose, and which valve may be provided with bearing surfaces on opposite faces thereof, and the term is to be so understood when construing the claims.

While the preferred form of the invention has been herein shown and described, it is to be understood that various changes may be made in the details of construction, and in the combination and arrangement of the several parts, within the scope of the claims, without departing from the spirit of this invention.

What is claimed as new is:

1. A rotary internal combustion engine embodying a crankshaft, a radially disposed cylinder, a piston in the cylinder, said cylinder being rotatable about the shaft, means to cause relative reciprocatory movement between the cylinder and piston, there being intake passages through the piston, a valve mounted for pivotal movement and provided with passages adapted to be brought into and out of register with the passages in the piston, means embodying a shaft for effecting pivotal movement of the valve, and means adapting said valve for pivotal movement with and for movement with respect to the shaft, the last said movement being in directions lengthwise of the shaft.

2. A rotary internal combustion engine embodying a crankshaft, a radially disposed cylinder, a piston in the cylinder, said cylinder being rotatable about the shaft, means to cause relative reciprocatory movement between the cylinder and piston, there being intake passages through the piston, a rotary valve provided with passages adapted to be brought into and out of register with the passages in the piston, exhaust ports for the combustion chamber of the cylinder, a second rotary valve for controlling the exhaust ports, the last said valve having passages therethrough, an operative connection between the valves, and means common to the valves for rotating them.

3. A rotary internal combustion engine embodying a crankshaft, a radially disposed cylinder, a piston in the cylinder, said cylinder being rotatable about the shaft, means to cause relative reciprocatory movement between the cylinder and piston, there being passages through the piston, a disc valve provided with passages adapted to be brought into and out of register with the passages in the piston, exhaust ports for the combustion chamber of the cylinder, a second disc valve for controlling the exhaust ports, the last said disc valve having port passages therethrough, an operative connection between the said valves, comprising a shaft disposed axially in the cylinder, extending lengthwise thereof and common to the valves for rotating them.

4. A rotary internal combustion engine embodying a crankshaft, a radially disposed cylinder, a piston in the cylinder, said cylinder being rotatable about the shaft, means to cause relative reciprocatory movement between the cylinder and piston, there being intake passages through the piston, a rotary valve provided with intake passages adapted to be brought into and out of register with the passages in the piston, means embodying a valve shaft disposed in the cylinder and passing through the piston, for rotating the valve, a bearing for said valve shaft, and means responsive to the rotation of said cylinder for rotating the valve shaft.

5. A rotary internal combustion engine embodying a crankshaft, a radially disposed cylinder rotatable about said shaft, a piston in the cylinder, means responsive to the rotation of the cylinder for effecting relative reciprocatory movement of the piston and cylinder, an exhaust port leading from the combustion chamber of the cylinder, a rotatable valve having exhaust passages for controlling said port, said valve being operatively timed with respect to said port, there being passages through the piston, a rotary valve for controlling the last said passages, means embodying a valve shaft for actuating the piston valve, said valve shaft passing through the piston and disposed within and extending lengthwise of the cylinder, the last said shaft being operatively connected to the exhaust port valve for actuating the latter, and means for rotating the valve shaft, the piston valve being movable with the piston and with respect to the valve shaft, the last said movement being in directions towards and away from the exhaust port valve.

6. A rotary internal combustion engine embodying a crankshaft, a radially disposed cylinder rotatable about said shaft, a piston in the cylinder, means responsive to the rotation of the cylinder for effecting relative reciprocatory movement of the piston and cylinder, an exhaust port leading from the combustion chamber of the cylinder, a rotary valve having passages for controlling said port, said valve being operatively fixed in timed relation with respect to said port, there being passages through the piston, a rotary valve for controlling the last said passages, means embodying a valve shaft for actuating the piston valve, said valve shaft passing through the piston and operatively connected to the exhaust port valve for actuating the latter, means for rotating the valve shaft, means connecting the piston valve to said valve shaft for sliding movement with respect thereto in directions lengthwise of the valve shaft, and means for maintaining the piston valve against rotation with respect to the valve shaft.

7. A rotary internal combustion engine embodying a crank shaft, a radially disposed cylinder rotatable about the shaft, an exhaust port from the combustion chamber of the cylinder, a rotary valve for controlling said port, a piston in the cylinder operatively connected with the said shaft, passages through the piston, a rotary valve for controlling said passages, means embodying a valve shaft disposed within and extending lengthwise of the cylinder and common to the said valves for rotating them, one of said valves being rotatable with and movable lengthwise of the valve shaft, means responsive to the rotation of the cylinder for rotating the valve shaft, the last said means embodying a stationary gear, and a gear connection between said stationary gear and said valve shaft.

8. A rotary internal combustion engine embodying a crank shaft, a radially disposed cylinder rotatable about the shaft, there being exhaust passages from the cylinder, a rotary valve for controlling said passages, a piston in the cylinder operatively connected with the crank shaft, passages through the piston, a rotary valve for controlling the last said passages, means embodying a valve shaft common to the valves for operating them, one of said valves being rotatable with and movable lengthwise of the valve shaft, means for rotating the valve shaft, the last said means embodying a stationary gear, a gear connection between said stationary gear and the said valve shaft, said gear connection embodying intermeshing bevel gears, one of which is connected to the valve shaft, and a spiral gear connected with one of the bevel gears and meshing with said stationary gear.

9. An internal combustion engine embodying a crank shaft, a radially disposed cylinder rotatable about the shaft, a piston in the cylinder operatively connected with the crank shaft, exhaust passages discharging from the cylinder, a rotary disc valve fixed with respect to the said passages for controlling them, there being passages through the piston, a rotary disc valve movable with and with respect to the piston for controlling the last said passages, a valve shaft angular in cross-section and connected with both of the valves for rotating them, one of said valves being adapted for movement with respect to the valve shaft in directions lengthwise thereof, and means embodying gear mechanism for rotating the said valve shaft.

10. An internal combustion engine embodying a crankshaft, a radially disposed cylinder rotatable about the shaft, a piston in the cylinder operatively connected with said shaft, exhaust passages in the cylinder end, fuel passages in the piston, rotary valves individual to the passages in the cylinder end and in the piston, an operating valve shaft common to the valves, one of said valves being lineally fixed with respect to the valve shaft, both of the valves being rotatable with the valve shaft, one of them being also movable lengthwise of the shaft and with the said piston as the latter is reciprocated, and means responsive to the rotation of said cylinder for rotating the valve shaft.

11. A rotary internal combustion engine, embodying a stationary crankshaft, a radially disposed cylinder rotatable about said shaft, a piston reciprocable in said cylinder, a pair of connecting rods connected with the said piston and operatively connected with said shaft at two positions spaced apart axially of the shaft, the head of the piston having fuel intake passages therethrough, a rotary intake valve carried by the piston having passages adapted to be brought into and out of register with said piston passages, exhaust ports provided in the cylinder head, an exhaust valve rotatably mounted in the cylinder head adapted for closing and opening said ports, a rotatably mounted valve-operating shaft between said connecting rods and non-reciprocably mounted relative to said cylinder, extending through said piston and intake valve and connected with both valves for rotating them, and means for rotating said valve-operating shaft.

12. A rotary internal combustion engine, embodying a stationary crankshaft, a radially disposed cylinder rotatable about said shaft, a piston reciprocable in said cylinder, means connecting the crankshaft and piston for reciprocating the latter during rotation of said cylinder, the head of the piston having fuel intake passages therethrough, a rotary intake valve carried by the piston adapted for closing and opening said passages, exhaust ports provided in the cylinder head, an exhaust valve rotatably mounted in the cylinder head adapted for closing and opening said ports, a rotatably mounted valve operating shaft slidably extending through one of said valves and connected with both valves for rotating them, and means for rotating said valve-operating shaft.

13. A rotary internal combustion engine embodying a stationary crankshaft, a radially disposed cylinder rotatable about said shaft, a piston reciprocable in said cylinder, means connecting the crankshaft and piston for reciprocating the latter during rotation of said cylinder, the head of the piston having fuel intake passages therethrough, a rotary intake valve carried by the piston adapted for closing and opening said passages, exhaust ports provided in the cylinder head, an exhaust valve rotatably mounted in the cylinder head adapted for closing and opening said ports, a rotatably mounted valve-operating shaft slidably extending axially through the piston and intake valve and connected with both valves for rotating them, and means for rotating said valve-operating shaft.

14. A rotary internal combustion engine, embodying a stationary crankshaft, a radially disposed cylinder rotatable about said shaft, a piston reciprocable in said cylinder, a pair of connecting rods connected with the piston and operatively connected with said shaft at two positions spaced apart axially of the shaft, a tortion resisting member connecting the rods together at a position intermediate their upper and lower ends and straddling the later mentioned valve-operating shaft, the head of the piston having fuel intake passages therethrough, a rotary intake valve carried by the piston having passages adapted to be brought into and out of register with said piston passages, exhaust ports provided in the cylinder head, an exhaust valve rotatably mounted in the cylinder head adapted for closing and opening said ports, a rotatably mounted valve operating shaft between said connecting rods and non-reciprocably mounted relative to said cylinder, extending through said piston and intake valve and connected with both valves for rotating them, and means for rotating said valve operating shaft.

LESLIE W. BEAVEN.

REFERENCES CITED

The following references are of record in the file of this patent:

UNITED STATES PATENTS

| Number | Name | Date |
|---|---|---|
| 895,653 | Marks | Aug. 11, 1908 |
| 915,828 | Cameron et al. | Mar. 23, 1909 |
| 1,093,659 | Thornley | Apr. 21, 1914 |
| 1,213,315 | Well | Jan. 23, 1917 |
| 1,236,472 | Nyquist | Aug. 14, 1917 |
| 1,328,484 | Bennett | Jan. 20, 1920 |
| 1,642,596 | Tebaldi | Sept. 13, 1927 |
| 2,417,894 | Wayland | Mar. 25, 1947 |

FOREIGN PATENTS

| Number | Country | Date |
|---|---|---|
| 15,839 | Great Britain | July 1, 1910 |
| 28,590 | Great Britain | Dec. 8, 1910 |
| 146,543 | Great Britain | July 15, 1920 |